US011235782B2

(12) United States Patent
Mimura et al.

(10) Patent No.: US 11,235,782 B2
(45) Date of Patent: Feb. 1, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Yoshitaka Mimura, Wako (JP); Masahiko Asakura, Wako (JP); Hironori Takano, Wako (JP); Junichi Maruyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 214 days.

(21) Appl. No.: 16/345,262

(22) PCT Filed: Nov. 10, 2016

(86) PCT No.: PCT/JP2016/083376
§ 371 (c)(1),
(2) Date: Apr. 26, 2019

(87) PCT Pub. No.: WO2018/087862
PCT Pub. Date: May 17, 2018

(65) Prior Publication Data
US 2019/0291744 A1 Sep. 26, 2019

(51) Int. Cl.
*B60W 50/08* (2020.01)
*B60W 10/04* (2006.01)
(Continued)

(52) U.S. Cl.
CPC ............ *B60W 50/08* (2013.01); *B60W 10/04* (2013.01); *B60W 10/20* (2013.01); *B60W 30/00* (2013.01);
(Continued)

(58) Field of Classification Search
CPC ...... B60W 10/00; B60W 10/04; B60W 10/20; B60W 30/00; B60W 30/18;
(Continued)

(56) References Cited

U.S. PATENT DOCUMENTS

2013/0110343 A1 5/2013 Ichikawa et al.
2015/0149023 A1* 5/2015 Attard ................... B60R 16/037
701/28
(Continued)

FOREIGN PATENT DOCUMENTS

CN 104648383 5/2015
CN 104724012 6/2015
(Continued)

OTHER PUBLICATIONS

JP2015118438_Description_English_Translation: pp. 1-47, generated by Espacenet—Patent Translate on Jan. 21, 2021 (Year: 2021).*
(Continued)

Primary Examiner — Geepy Pe
Assistant Examiner — Michael Allen Brace, Jr.
(74) Attorney, Agent, or Firm — Amin, Turocy & Watson, LLP

(57) ABSTRACT

A vehicle control system includes: an automated driving controller configured to execute automated driving in which at least one of acceleration/deceleration and steering of a vehicle is automatically controlled; and a mode setter configured to set a mode of the automated driving which is executed by the automated driving controller and to set the mode of automated driving to an exchangeable mode in which an occupant who sits in a driver seat is able to be exchanged when the automated driving is executed in a mode in which an occupant needs to sit in the driver seat of the vehicle and predetermined conditions have been satis-
(Continued)

fied. Accordingly, it is possible to enable smooth exchange of an occupant during automated driving.

18 Claims, 8 Drawing Sheets

(51) Int. Cl.
*B60W 10/20* (2006.01)
*B60W 30/18* (2012.01)
*B60W 30/00* (2006.01)
*B60W 50/10* (2012.01)
*B60W 50/00* (2006.01)

(52) U.S. Cl.
CPC ...... *B60W 30/18163* (2013.01); *B60W 50/10* (2013.01); *B60W 2050/0073* (2013.01); *B60W 2540/00* (2013.01); *B60W 2556/00* (2020.02)

(58) Field of Classification Search
CPC ..... B60W 30/18009; B60W 30/18163; B60W 50/00; B60W 50/08; B60W 50/10; B60W 2050/0062; B60W 2050/0063; B60W 2050/0073; B60W 2540/00; B60W 2556/00
See application file for complete search history.

(56) References Cited

U.S. PATENT DOCUMENTS

| | | | |
|---|---|---|---|
| 2015/0283998 A1* | 10/2015 | Lind | B60W 30/17 701/23 |
| 2016/0107653 A1* | 4/2016 | Fung | A61B 5/18 701/41 |
| 2016/0159251 A1 | 6/2016 | Ebina et al. | |
| 2017/0043788 A1* | 2/2017 | Cullinane | B60R 16/023 |
| 2017/0225677 A1* | 8/2017 | Yoshida | B60W 30/025 |
| 2017/0248952 A1* | 8/2017 | Perkins | G05D 1/0061 |
| 2017/0291602 A1* | 10/2017 | Newman | G08G 1/16 |
| 2018/0015922 A1* | 1/2018 | McNew | B60W 10/18 |

FOREIGN PATENT DOCUMENTS

| | | |
|---|---|---|
| CN | 104837705 | 8/2015 |
| JP | 2007-196815 | 8/2007 |
| JP | 2015-118438 | 6/2015 |
| KR | 2003-0083885 | 11/2003 |
| WO | 2011-158347 | 12/2011 |
| WO | 2015-011866 | 1/2015 |
| WO | 2016-052507 | 4/2016 |
| WO | 2016-080452 | 5/2016 |

OTHER PUBLICATIONS

International Search Report and Written Opinion for International Application No. PCT/JP2016/083376 dated Jan. 31, 2017, 10 pgs.
Chinese Office Action for Chinese Patent Application No. 201680090396.0 dated Jul. 16, 2021.

* cited by examiner

FIG. 7

| RUNNING STATE | PREDETERMINED CONDITIONS |
|---|---|
| LANE KEEPING | SATISFIED |
| LANE CHANGE | NOT SATISFIED |
| BRANCHING | NOT SATISFIED |
| MERGING | NOT SATISFIED |
| OVERTAKING | NOT SATISFIED |
| ACCELERATION WITH HIGHER THAN PREDETERMINED ACCELERATION | NOT SATISFIED |
| DECELERATION WITH HIGHER THAN PREDETERMINED DECELERATION | NOT SATISFIED |
| HANDOVER | NOT SATISFIED |

FIG. 8

| LINK ID | PREDETERMINED CONDITION | TYPE OF ROAD |
|---|---|---|
| 001 | SATISFIED | MOTORWAY |
| 002 | SATISFIED | MOTORWAY |
| ⋮ | ⋮ | ⋮ |
| 098 | NOT SATISFIED | GENERAL ROAD |
| 0099 | NOT SATISFIED | GENERAL ROAD |

VEHICLE CONTROL SYSTEM, VEHICLE CONTROL METHOD, AND VEHICLE CONTROL PROGRAM

TECHNICAL FIELD

The invention relates to a vehicle control system, a vehicle control method, and a vehicle control program.

BACKGROUND ART

In recent years, a technique of controlling a vehicle such that the vehicle runs automatically along a route to a destination has been studied. In this regard, a driving support device that determines a mode of automated driving based on whether a destination of the automated driving is set when a driver's operation instructs the start of automated driving of a vehicle and determines the mode of automated driving to be one in which the vehicle runs along the current road or automated stopping when it is known that a destination is not set (for example, see Patent Literature 1).

CITATION LIST

Patent Literature

Patent Literature 1

PCT International Publication No. WO 2011/158347

SUMMARY OF INVENTION

Technical Problem

However, in the related art, exchange of an occupant who sits in a driver seat at the time of automated driving has not been considered.

The invention is made in consideration of the above-mentioned circumstances and an objective thereof is to provide a vehicle control system, a vehicle control method, and a vehicle control program that can enable smooth exchange of an occupant who sits in a driver seat during automated driving.

Solution to Problem

According to an aspect, described is a vehicle control system (1) including: an automated driving controller (100) configured to execute automated driving in which at least one of acceleration/deceleration and steering of a vehicle is automatically controlled; and a mode setter (124) configured to set a mode of the automated driving which is executed by the automated driving controller and to set the mode of automated driving to an exchangeable mode in which an occupant who sits in a driver seat of the vehicle is able to be exchanged when the automated driving is executed in a mode in which an occupant needs to sit in the driver seat and predetermined conditions have been satisfied.

According to another aspect, described is the vehicle control system further including a sitting determiner (130) configured to determine whether an occupant of the vehicle is sitting in the driver seat, wherein the mode setter is configured to cause an information outputter (30) to output a warning when the exchangeable mode is not set and the sitting determiner determines that an occupant of the vehicle is not sitting in the driver seat.

According to another aspect, described is the vehicle control system further including a sitting determiner configured to determine whether an occupant of the vehicle is sitting in the driver seat, wherein the automated driving controller is configured to stop execution of the automated driving when the exchangeable mode is not set by the mode setter and the sitting determiner determines that an occupant of the vehicle is not sitting in the driver seat.

According to another aspect, described is the vehicle control system wherein the mode setter is configured to invalidate the exchangeable mode after a first predetermined time has elapsed after the exchangeable mode has been set.

According to another aspect, described is the vehicle control system wherein the automated driving controller is configured to execute an automated driving mode which is selected from a plurality of automated driving modes having different degrees of automated driving, and wherein the first predetermined time is set depending on the automated driving mode which is being executed by the automated driving controller.

According to another aspect, described is the vehicle control system wherein the mode setter is configured to cause the information outputter to output information on the first predetermined time.

According to another aspect, described is the vehicle control system wherein the predetermined conditions are satisfied when a running state of the vehicle is a predetermined running state.

According to another aspect, described is the vehicle control system wherein the predetermined running state is a state in which the vehicle is running in a motorway.

According to another aspect, described is the vehicle control system wherein the predetermined running state is a state in which the vehicle is running while a lane on which the vehicle runs is kept the same.

According to another aspect, described is the vehicle control system wherein the predetermined running state is a state in which the vehicle is not performing any one of lane change, overtaking running, running in a merging zone, and running in a branching zone.

According to another aspect, described is the vehicle control system wherein the predetermined running state is a state in which the vehicle is not scheduled to perform any one of lane change, overtaking running, running in a merging zone, running in a branching zone, and ending of automated driving within a predetermined time.

According to another aspect, described is the vehicle control system wherein the predetermined conditions include a condition that a predetermined operation has been performed by an occupant of the vehicle.

According to another aspect, described is the vehicle control system wherein the automated driving controller is configured to limit certain functions associated with automated driving when the exchangeable mode is being executed.

According to another aspect, described is the vehicle control system wherein the some functions include at least one function from a function of performing lane change, a function of performing overtaking, a function of performing running for merging with a main lane from a merging lane, a function of performing running to a branch lane from a main lane in a branching zone, and a function of changing a destination.

According to another aspect, described is the vehicle control system wherein the automated driving controller is configured to set a distance to another vehicle which is automatically controlled when the exchangeable mode is set, the distance being longer than a distance to another vehicle when the exchangeable mode is not set the vehicle.

According to another aspect, described is the vehicle control system further comprising a driver seat controller configured to change a form of the driver seat in which the occupant sits when the exchangeable mode is set by the mode setter.

According to another aspect, described is the vehicle control system further including a sitting determiner configured to determine whether an occupant of the vehicle is sitting in the driver seat, wherein the mode setter is configured to end the exchangeable mode when the sitting determiner detects exchange of an occupant after the exchangeable mode has been set.

According to another aspect, described is a vehicle control method causing an onboard computer to perform: setting a mode of automated driving which is executed by an automated driving controller configured to execute automated driving in which at least one of acceleration/deceleration and steering of a vehicle is automatically controlled; and setting the mode of the automated driving to an exchangeable mode in which an occupant who sits in a driver seat of the vehicle is able to be exchanged when the automated driving is executed in a mode in which an occupant needs to sit in the driver seat and predetermined conditions have been satisfied.

According to another aspect, described is a vehicle control program causing an onboard computer to perform: a process of setting a mode of automated driving which is executed by an automated driving controller configured to execute automated driving in which at least one of acceleration/deceleration and steering of a vehicle is automatically controlled; and a process of setting the mode of the automated driving to an exchangeable mode in which an occupant who sits in a driver seat of the vehicle is able to be exchanged when the automated driving is executed in a mode in which an occupant needs to sit in the driver seat and predetermined conditions have been satisfied.

According to another aspect, described is the mode setter can set the mode of automated driving to the exchangeable mode in which exchange of an occupant who sits in the driver seat is enabled when automated driving is executed in a mode in which an occupant of the vehicle needs to sit in the driver seat and predetermined conditions are satisfied, whereby it is possible to enable smooth exchange of an occupant of the vehicle who sits in the driver seat during automatic driving.

According to another aspect, described is the mode setter can cause the information outputter to output a warning or stop execution of automated driving when the exchangeable mode is not set and it is determined that an occupant of the vehicle is not sitting in the driver seat, whereby it is possible to further improve safety.

According to another aspect, described is the mode setter can cause the information outputter to output information associated with the first predetermined time, whereby an occupant of the vehicle can recognize information associated with the exchangeable mode such as a remaining time of the exchangeable mode.

According to another aspect, described is the predetermined conditions are satisfied when the running state of the vehicle is a predetermined running state. Specifically, since the predetermined conditions are satisfied when behavior of the vehicle is stable, it is possible to enable smoother exchange of an occupant of the vehicle.

According to another aspect, since the predetermined conditions include a condition that a predetermined operation has been performed by an occupant of the vehicle, it is possible to more reliably set the exchangeable mode.

According to another aspect, since some functions associated with automated driving are limited when the exchangeable mode is being executed, it is possible to stabilize behavior of the vehicle when the exchangeable mode is set.

According to another aspect, since the inter-vehicle distance becomes longer when the exchangeable mode is being executed than when the exchangeable mode is not set, it is possible to curb great change of behavior of the vehicle even when a preceding vehicle decelerates.

According to another aspect, when the exchangeable mode is set, an occupant of the vehicle can easily sit on or leave the driver seat by changing the form of the driver seat in which the occupant of the vehicle sits.

BRIEF DESCRIPTION OF DRAWINGS

FIG. 7 is a diagram illustrating an example of a running state in which predetermined conditions are satisfied and a running state in which the predetermined conditions are not satisfied.

FIG. 8 is a diagram illustrating an example of a link ID in which predetermined conditions are satisfied and a link ID in which the predetermined conditions are not satisfied.

DESCRIPTION OF EMBODIMENTS

Hereinafter, a vehicle control system, a vehicle control method, and a vehicle control program according to an embodiment of the invention will be described with reference to the accompanying drawings.

Hereinafter, a vehicle control system, a vehicle control method, and a vehicle control program according to an embodiment of the invention will be described with reference to the accompanying drawings.

First Embodiment

[Entire Configuration]

Figure 1:
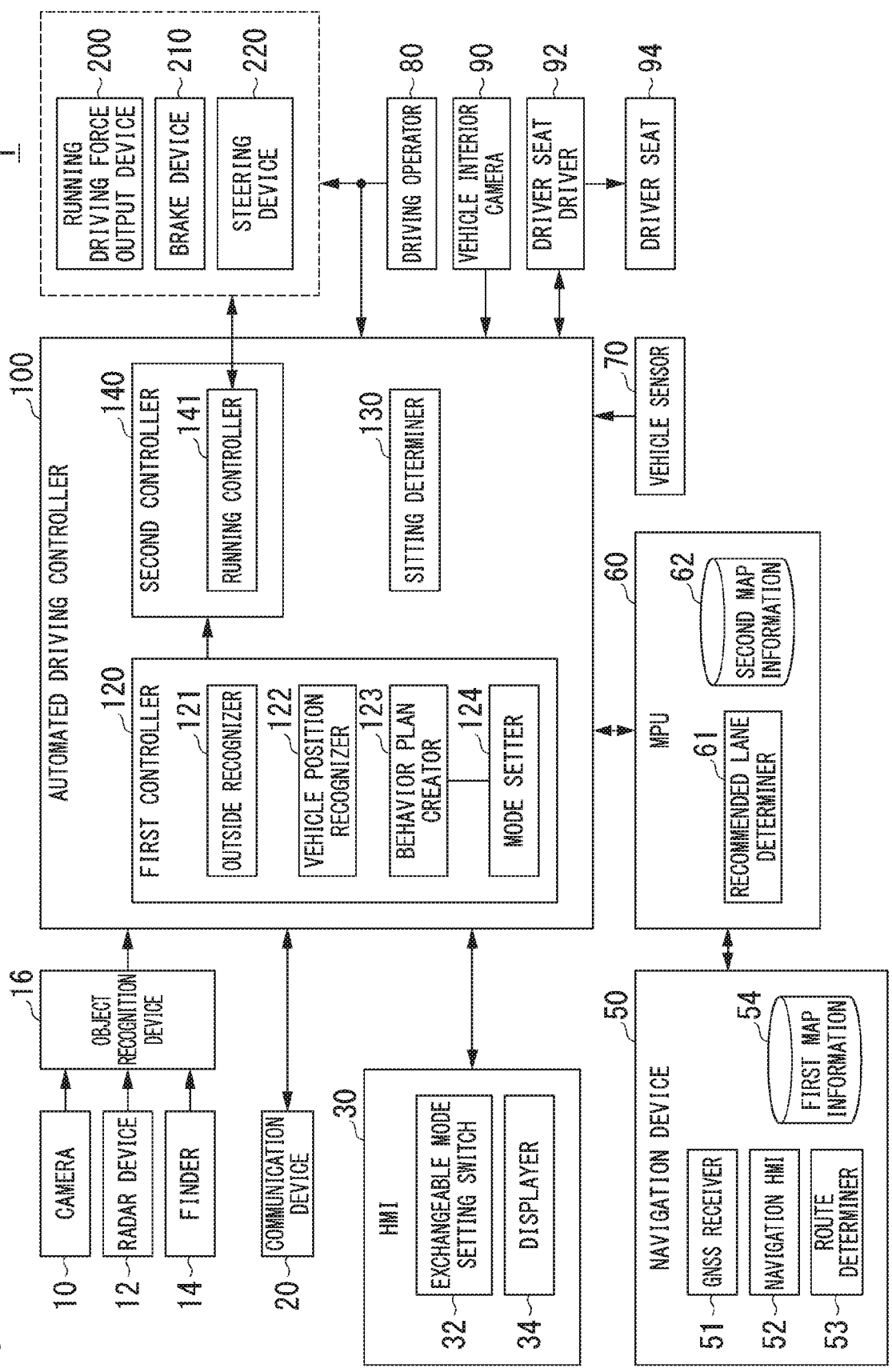
FIG. 1 is a diagram illustrating a configuration of a vehicle system 1 including an automated driving controller 100.

FIG. 1 is a diagram illustrating a configuration of a vehicle system 1 including an automated driving controller 100. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to an internal combustion engine or electric power which is discharged from a secondary battery or a fuel cell.

The vehicle system 1 includes, for example, a camera 10, a radar device 12, a finder 14, an object recognition device 16, a communication device 20, a human-machine interface (HMI) 30, an electronic toll collection system (ETC) onboard device 40, a navigation device 50, a micro-processing unit (MPU) 60, a vehicle sensor 70, a driving operator 80, a vehicle interior camera 90, a driver seat driver 92, a driver seat 94, an automated driving controller 100, a driving support control unit 200, a brake device 210, and a steering device 220. These devices or units are connected to each other via a multiplex communication line such as a controller area network (CAN) communication line, a serial communication line, a radio communication network, or the like. The configuration illustrated in FIG. 1 is only an example and some of the elements may be omitted or another element may be added thereto. A "vehicle control system" includes, for example, a vehicle interior camera 90, a behavior plan creator 123, a mode setter 124, a sitting determiner 130, and a running controller 141.

The camera 10 is, for example, a digital camera using a solid-state imaging device such as a charge coupled device (CCD) or a complementary metal oxide semiconductor (CMOS). One or more cameras 10 are attached to arbitrary positions on a vehicle (hereinafter referred to as a host vehicle M) in which the vehicle system 1 is mounted. When a front scene is imaged, the camera 10 is attached to an upper part of a front windshield, a rear surface of a rearview mirror, or the like. The camera 10 images the surroundings of the host vehicle M, for example, periodically and repeatedly. The camera 10 may be a stereoscopic camera.

The radar device 12 radiates radio waves such as millimeter radio waves to the surroundings of the host vehicle M, detects radio waves (reflected waves) reflected by an object, and detects at least a position (a distance and a direction) of the object. One or more radar devices 12 are attached to arbitrary positions of the host vehicle M. The radar device 12 may detect a position and a speed of an object using a frequency modulated continuous wave (FM-CW) method.

The finder 14 is a light detection and ranging or laser imaging detection and ranging device (LIDAR) that measures scattered light in response to applied light and detects a distance to an object. One or more finders 14 are attached to arbitrary positions of the host vehicle M.

The object recognition device 16 performs sensor fusion processing on detection results from some or all of the camera 10, the radar device 12, and the finder 14 and recognizes a position, a type, a speed, and the like of an object. The object recognition device 16 outputs the recognition results to the automated driving controller 100.

The communication device 20 communicates with another vehicle around the host vehicle M, for example, using a cellular network, a Wi-Fi network, Bluetooth (registered trademark), dedicated short range communication (DSRC), or the like or communicates with various server devices via a radio base station.

The HMI 30 presents a variety of information to an occupant of the host vehicle M and receives an input operation from the occupant. The HMI 30 includes an exchangeable mode setting switch 32, a displayer 34, various display devices, speakers, buzzers, touch panels, switches, and keys. The displayer 34 is, for example, a so-called touch panel which is formed integrally with an input operator. The function of the exchangeable mode setting switch 32 will be described later.

The navigation device 50 includes, for example, a global navigation satellite system (GNSS) receiver 51, a navigation HMI 52, and a route determiner 53, and stores first map information 54 in a storage device such as a hard disk drive (HDD) or a flash memory. The GNSS receiver identifies a position of the host vehicle M on the basis of signals received from GNSS satellites. The position of the host vehicle M may be identified or complemented by an inertial navigation system (INS) using the output of the vehicle sensor 70. The navigation HMI 52 includes a display device, a speaker, a touch panel, and keys. All or some elements of the navigation HMI 52 may be shared by the HMI 30. For example, the route determiner 53 determines a route from the position of the host vehicle M (or an input arbitrary position) identified by the GNSS receiver 51 to a destination input by an occupant using the navigation HMI 52 with reference to the first map information 54. The first map information 54 is, for example, information in which road shapes are expressed by links indicating roads and nodes connected by the links. The first map information 54 may include curvatures of roads or point of interest (POI) information. The route determined by the route determiner 53 is output to the MPU 60. The navigation device 50 may perform guidance for a route using the navigation HMI 52 on the basis of the route determined by the route determiner 53. The navigation device 50 may be realized, for example, by a function of a terminal device such as a smartphone or a tablet terminal which is carried by a user. The navigation device 50 may transmit a current position and a destination to a navigation server via the communication device 20 and may acquire a route which is returned from the navigation server.

The MPU 60 serves as, for example, a recommended lane determiner 61 and stores second map information 62 in a storage device such as an HDD or a flash memory. The recommended lane determiner 61 divides a route supplied from the navigation device 50 into a plurality of blocks (for example, every 100 [m] in a vehicle running direction) and determines a recommended lane for each block with reference to the second map information 62. The recommended lane determiner 61 determines in which lane from the leftmost the vehicle will run. When a branching zone or a merging zone is present in the route, the recommended lane determiner 61 determines a recommended lane such that the host vehicle M runs on a rational route for going to a branching destination.

The second map information 62 is map information with higher precision than the first map information 54. The second map information 62 includes, for example, information of the center of a lane or information of boundaries of a lane. The second map information 62 may include road information, traffic regulations information, address information (addresses and post numbers), facility information, and phone number information. The road information includes information indicating a type of a road such as an expressway, a toll road, a national road, and a prefectural road or information such as the number of lanes of a road, a width of each lane, a gradient of a road, a position of a road (three-dimensional coordinates including longitude, latitude, and height), curvatures of curves of lanes, positions of merging and branching zones of each lane, and signs marked on a road. The second map information 62 may be updated from time to time by accessing another device using the communication device 20.

The vehicle sensor 70 includes a vehicle speed sensor that detects a speed of the host vehicle M, an acceleration sensor that detects an acceleration, a yaw rate sensor that detects an angular velocity around a vertical axis, and a direction sensor that detects a direction of the host vehicle M.

The driving operator 80 includes, for example, an accelerator pedal, a brake pedal, a shift lever, a steering wheel, and other operators. A sensor that detects an amount of operation or whether an operation has been performed is attached to each driving operator 80, and detection results thereof are output to the automated driving controller 100, the running driving force output device 200, and one or both of the brake device 210 and the steering device 220.

The vehicle interior camera 90 images, for example, an interior scene centered on the driver seat 94 and an occupant present in the vicinity of the driver seat 94. An image captured by the vehicle interior camera 90 is output to the automated driving controller 100. The driver seat driver 92 (a driver seat controller) changes a position of the driver seat 94 or a tilt of a backrest of the driver seat 94 in response to an instruction from the automated driving controller 100.

The automated driving controller 100 includes, for example, a first controller 120, a sitting determiner 130, and a second controller 140. The first controller 120, the sitting determiner 130, and the second controller 140 are embodied by causing a processor such as a central processing unit (CPU) to execute a program (software). Some or all of the functional units may be embodied by hardware such as a large scale integration (LSI), an application specific integrated circuit (ASIC), or a field-programmable gate array (FPGA) or may be embodied in cooperation between software and hardware.

The first controller 120 includes, for example, an outside recognizer 121, a vehicle position recognizer 122, and a behavior plan creator 123.

The outside recognizer 121 recognizes states such as positions, speeds, and accelerations of neighboring vehicles on the basis of information input from the camera 10, the radar device 12, and the finder 14 via the object recognition device 16. A position of a neighboring vehicle may be expressed by a representative point such as the center of gravity or corners of the neighboring vehicle or may be expressed by an area which is represented by a profile of the neighboring vehicle. A "state" of a neighboring vehicle may include an acceleration, a jerk, or a "behavior condition" (for example, whether lane change is being performed or is intended) of the neighboring vehicle. The outside recognizer 121 may recognize guard rails, utility poles, parked vehicles, pedestrians, or other objects in addition to a neighboring vehicle.

The vehicle position recognizer 122 recognizes, for example, a lane (a running lane) in which the host vehicle M is running and a relative position and a direction of the host vehicle M with respect to the running lane. The vehicle position recognizer 122 recognizes the running lane, for example, by comparing a pattern of road defining lines around the host vehicle M which is recognized from the images captured by the camera 10 with a pattern of road defining lines (for example, arrangements of solid lines and dotted lines) which is acquired from the second map information 62. In this recognition, the position of the host vehicle M acquired from the navigation device 50 or processing results from the INS may be considered.

Figure 2:
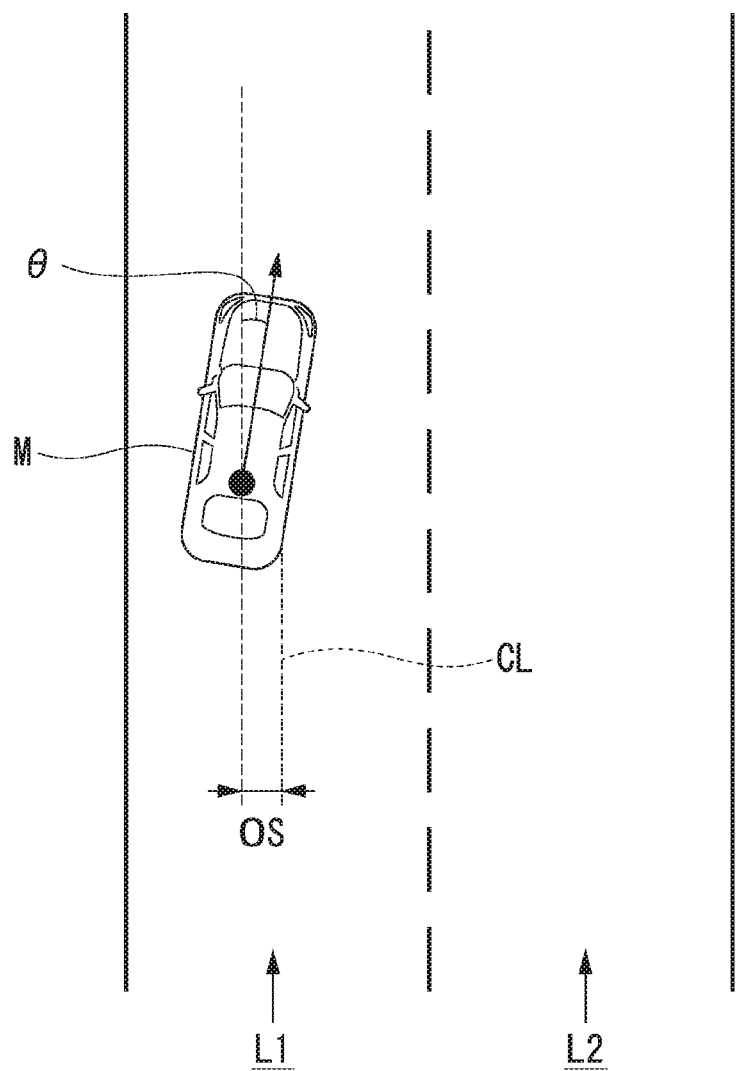
FIG. 2 is a diagram illustrating a state in which a relative position and a direction of a host vehicle M with respect to a running lane L1 are recognized by a vehicle position recognizer 122.

Then, the vehicle position recognizer 122 recognizes, for example, a position and a direction of the host vehicle M relative to the running lane. FIG. 2 is a diagram illustrating a state in which a position and a direction of the host vehicle M relative to a running lane L1 are recognized by the vehicle position recognizer 122. The vehicle position recognizer 122 recognizes, for example, a separation OS between a reference point (for example, the center of gravity) of the host vehicle M and a running lane center CL and an angle $\theta$ formed by the running direction of the host vehicle M and a line of the running lane center CL as the position and the direction of the host vehicle M relative to the running lane L1. Instead, the vehicle position recognizer 122 may recognize a position of the reference point of the host vehicle M relative to one edge of the running lane L1 or the like as a position of the host vehicle M relative to the running lane. The relative position of the host vehicle M recognized by the vehicle position recognizer 122 is supplied to the recommended lane determiner 61 and the behavior plan creator 123.

The behavior plan creator 123 determines events which are sequentially performed in automated driving such that the host vehicle runs in the recommended lane determined by the recommended lane determiner 61 and copes with surrounding conditions of the host vehicle M. Examples of the events include a constant-speed running event in which a vehicle runs in the same running lane at a constant speed, a following running event in which a vehicle runs to follow a preceding vehicle, a lane change event, a merging event, a branching event, an emergency stop event, and a handover event in which automated driving is ended and handed over to manual driving. During execution of such events, behavior for avoidance may be planned on the basis of surrounding conditions of the host vehicle M (such as presence of a neighboring vehicle or a pedestrian and lane narrowing due to roadwork).

The behavior plan creator 123 generates a target path in which the host vehicle M will run in the future. A target path includes, for example, a speed element. For example, a target path is generated as a set of target points (path points) at which the host vehicle will arrive at a plurality of reference times in the future in a state in which the reference times are set every predetermined sampling time (for example, about several tenths of a [sec]). Accordingly, when a gap between path points is large, it means that the host vehicle runs at a high speed in a section between the path points.

Figure 3:
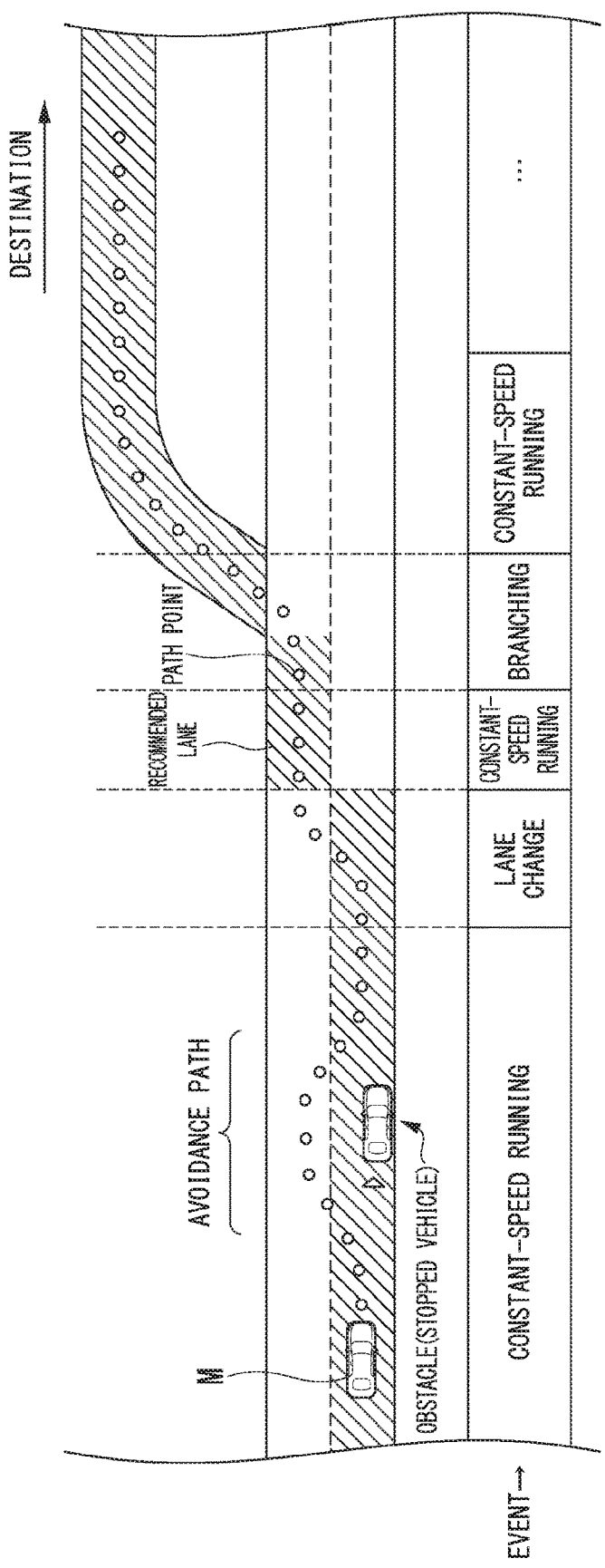
FIG. 3 is a diagram illustrating a state in which a target path is generated based on a recommended lane.

FIG. 3 is a diagram illustrating a state in which a target path is generated on the basis of a recommended lane. As illustrated in the drawing, the recommended lane is set to be convenient for running along a route to a destination. When the vehicle reaches a position a predetermined distance (which may be determined depending on an event type) prior to a switching point of the recommended lane, the behavior plan creator 123 starts a lane change event, a branching event, a merging event, or the like. When it is necessary to avoid an obstacle during execution of each event, an avoidance path is generated as illustrated in the drawing.

For example, the behavior plan creator 123 generates a plurality of candidates for the target path and selects an optimal target path at that time in view of safety and efficiency.

Details of the processing of the mode setter 124 and the sitting determiner 130 will be described later.

The second controller 140 includes a running controller 141. The running controller 141 controls the running driving force output device 200, the brake device 210, and the steering device 220 such that the host vehicle M passes along the target path generated by the behavior plan creator 123 at the scheduled times.

The running driving force output device 200 outputs a running driving force (a torque) for allowing a vehicle to travel to driving wheels. The running driving force output device 200 includes, for example, a combination of an internal combustion engine, an electric motor, and a transmission and an ECU that controls them. The ECU controls the above-mentioned elements on the basis of information input from the running controller 141 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of information input from the running controller 141 or information input from the driving operator 80 such that a brake torque based on a braking operation is output to vehicle wheels. The brake device 210 may include a mechanism for transmitting a hydraulic pressure generated by an operation of the brake pedal included in the driving operator 80 to the cylinder via a master cylinder as a backup. The brake device 210 is not limited to the above-mentioned configuration, and may be an electronically controlled hydraulic brake device that controls an actuator on the basis of information input from the running controller 141 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of information input from the running controller 141 or information input from the driving operator 80 to change the direction of the turning wheels.

[Mode Setting]

Mode setting in automated driving will be described below. The mode setter 124 determines an automated driving mode on the basis of an event, a target path, or the like which is determined by the behavior plan creator 123. The automated driving mode in this embodiment includes, for example, a first automated driving mode having a high degree of automated driving, a second automated driving mode having a lower degree of automated driving than the first automated driving mode, and an exchangeable mode. The first automated driving mode is an automated driving mode in which an occupant of a vehicle does not have to observe the surroundings and the occupant does not have to sit in the driver seat 94. The second automated driving mode is an automated driving mode in which an occupant of the vehicle has to observe the surroundings and an occupant has to sit in the driver seat 94. Here, "have to observe" means that there is a likelihood that automated driving will be unexpectedly stopped and has to be immediately handed over to manual driving of an occupant.

The exchangeable mode is a mode of automated driving which is temporarily set when automated driving is being executed in the second automated driving mode and predetermined conditions are satisfied. When the exchangeable mode is set, exchange of an occupant who sits in the driver seat 94 in which the occupant temporarily leaves the driver seat 94 and another occupant sits in the driver seat 94 becomes possible. Details thereof will be described later with reference to the flowchart illustrated in FIG. 4.

The exchangeable mode is an automated driving mode in which the host vehicle M is controlled such that the running state or behavior of the host vehicle M is more stable than that in other automated driving modes. When the mode setter 124 sets the exchangeable mode, the following control is executed by the behavior plan creator 123. For example, the behavior plan creator 123 sets an inter-vehicle distance to another vehicle which is automatically controlled to be longer than when the exchangeable mode is not set. The behavior plan creator 123 further curbs acceleration/deceleration in comparison with other automated driving modes.

When the exchangeable mode ends, the automated driving mode which has been executed before the exchangeable mode is executed may be executed or an automated driving mode which is determined on the basis of an event or surrounding conditions may be executed.

[Processing of Sitting Determiner]

The sitting determiner 130 determines whether an occupant of the host vehicle M sits in the driver seat 94. For example, the sitting determiner 130 performs an image recognizing process on an image captured by the vehicle interior camera 90. For example, the sitting determiner 130 acquires pixels or groups of pixels having higher luminance than neighboring pixels in the image as feature points (edges) and recognizes profiles of a person and the driver seat 94 from the feature points. The sitting determiner 130 may recognize feature regions such as an eye, a nose, and a mouth from a distribution of feature points.

A profile which is recognized from feature points acquired from an image obtained by imaging the driver seat 94 where there is nothing and which is acquired in advance by experiment or the like is stored in a storage device which is included in the automated driving controller 100. Profiles of persons (profiles in various situations of persons including a profile of a person in a non-sitting state (who is to leave the driver seat 94) or a profile of a person in a sitting state) which are acquired in advance by experiment or the like are stored in the storage device.

The sitting determiner 130 compares the profile of the driver seat 94 stored in advance in the storage device with the recognition result of an image (an interior image) captured by the vehicle interior camera 90, recognizes a person who sits in the driver seat 94 when a profile (or the above-mentioned feature region) which is estimated to be a person who sits in the driver seat is added to the profile of the driver seat 94, and recognizes no person who sits in the driver seat 94 when the profile is not added thereto.

Instead of the above-mentioned image recognizing process, sitting or non-sitting (leaving a seat) of a person may be recognized on the basis of detection results from a weight sensor, a pressure sensor, or a light-transmitting object recognition sensor which is provided in the driver seat 94.

[Flowchart]

Figure 4:
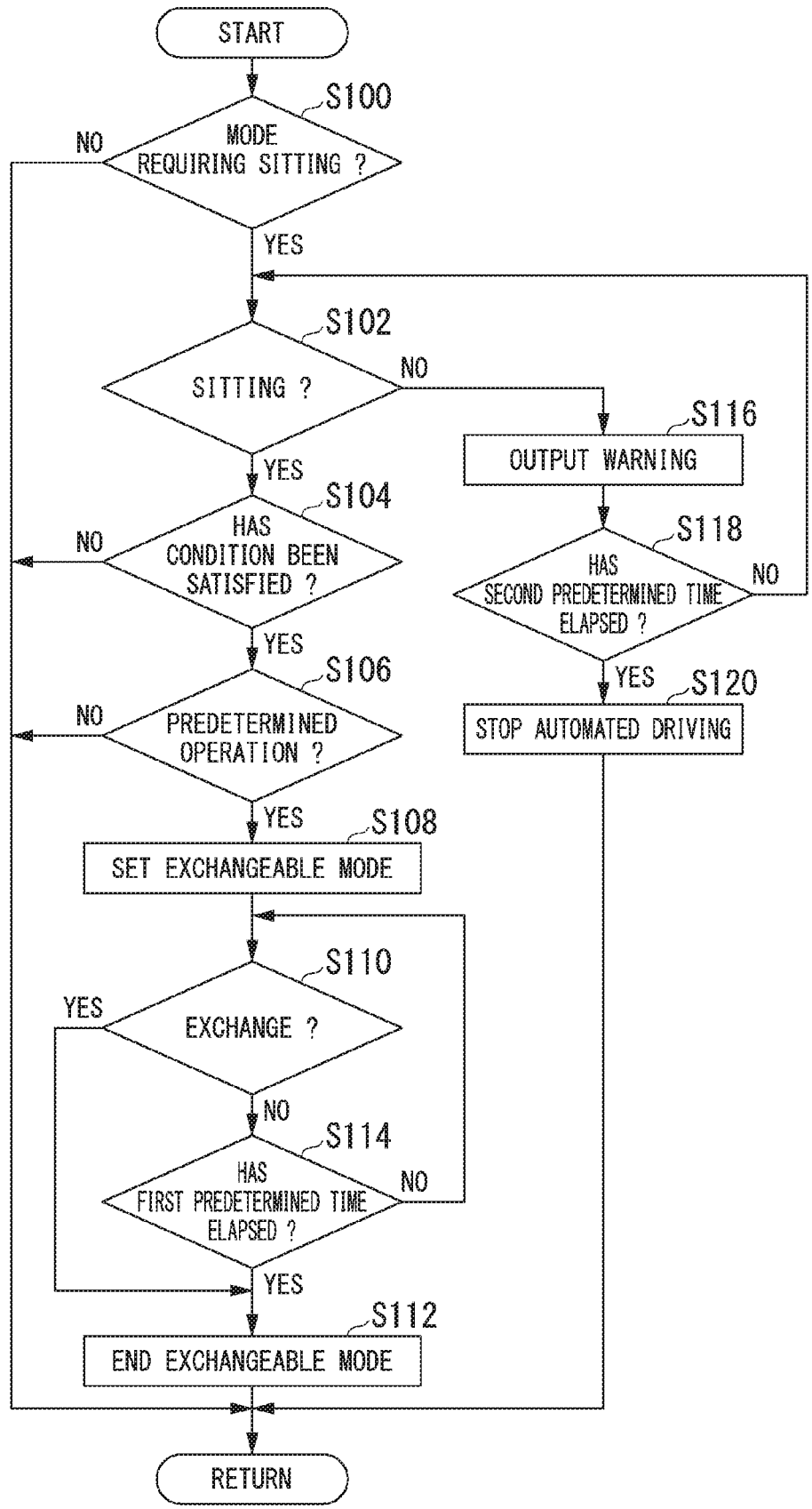
FIG. 4 is a flowchart illustrating a process flow which is mainly performed by a mode setter 124.

FIG. 4 is a flowchart illustrating a process flow which is mainly performed by the mode setter 124. The process flow of this flowchart is a routine which is performed when automated driving is being executed. First, the mode setter 124 determines whether an automated driving mode which is being executed is an automated driving mode (the second automated driving mode) in which an occupant has to sit in the driver seat (Step S100). When the automated driving mode is not an automated driving mode in which an occupant has to sit in the driver seat, the process flow of the flowchart ends.

When the automated driving mode is an automated driving mode in which an occupant has to sit in the driver seat, the sitting determiner 130 performs an image recognizing process on an image captured by the vehicle interior camera 90 and determines whether an occupant sits in the driver seat 94 (Step S102). When an occupant sits in the driver seat 94, the mode setter 124 determines whether predetermined conditions have been satisfied (Step S104). Details of the predetermined conditions will be described later.

When the predetermined conditions have not been satisfied, the processes of one routine of the flowchart end. When the predetermined conditions have been satisfied, the mode setter 124 determines whether a predetermined operation has been performed by an occupant (Step S106). The predetermined operation is an operation which is performed by an occupant to present the occupant's intention for exchange. For example, the predetermined operation is an occupant's operation of pressing the exchangeable mode setting switch 32. When the exchangeable mode setting switch 32 is pressed, the mode setter 124 acquires information indicating that the exchangeable mode setting switch 32 is pressed. The predetermined operation may be included in the predetermined conditions. When the predetermined operation is not performed in a predetermined time, the process flow of the flowchart ends.

When the predetermined operation is performed, the mode setter 124 sets the exchangeable mode (Step S108). When the exchangeable mode is set, an occupant who sits in the driver seat 94 is allowed to temporarily leave the seat. That is, exchange of the occupant who sits in the driver seat 94 is allowed. Then, the mode setter 124 determines whether exchange of an occupant has been performed on the basis of the image processing result from the sitting determiner 130 (Step S110). For example, when it is determined on the basis of the result of the image recognizing process that the occupant recognized in Step S102 leaves the seat and another occupant sits in the driver seat 94, the mode setter 124 determines that the occupant has exchanged. Whether the occupants are the same person is determined, for example, by comparing feature points of faces extracted through the image recognizing process.

When it is determined on the basis of the result of the image recognizing process that the occupant recognized in Step S102 leaves the seat and the occupant having left the seat sits in the seat again, the mode setter 124 may consider that the occupant has exchanged. That is, when the exchangeable mode is set, an occupant who sits in the driver seat 94 can temporarily leave the seat and take a thing in a rear seat or finish a job. When an occupant has exchanged and the exchangeable mode setting switch 32 has been pressed by the occupant, the mode setter 124 may determine that the occupant has exchanged.

When the occupant has exchanged, the mode setter 124 ends the exchangeable mode (Step S112). When the occupant has not exchanged, the mode setter 124 determines whether a first predetermined time has elapsed (Step S114). The first predetermined time is a time in which the exchangeable mode is maintained. Exchange of an occupant is possible in the first predetermined time. The length of the first predetermined time may be set in advance by allowing an occupant of the vehicle to operate an operator of the HMI 30.

When the first predetermined time has not been elapsed, the process flow returns to the process of Step S110. When the first predetermined time has elapsed, the mode setter 124 performs the process of Step S112. When the first predetermined time has elapsed, the mode setter 124 invalidates the exchangeable mode. At this time, the mode setter 124 prompts exchange of an occupant by causing the HMI 30 to output a warning. The first controller 120 may immediately stop the host vehicle M.

Figure 5:
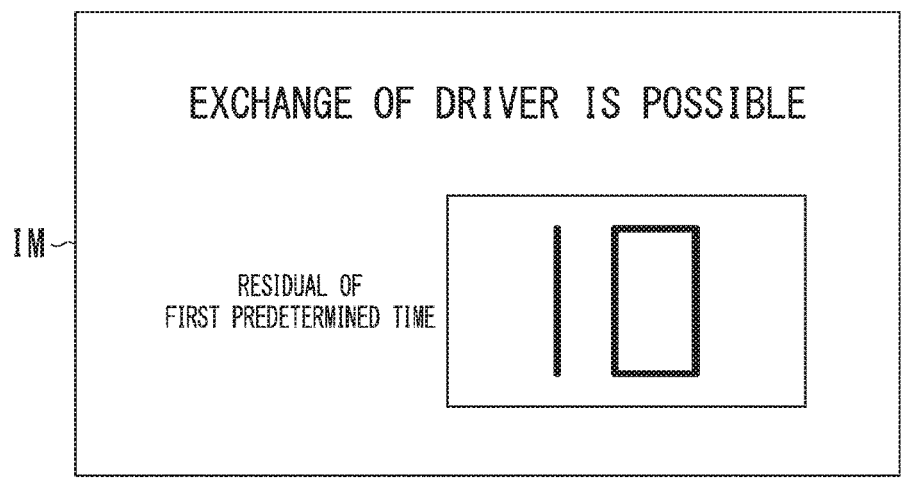
FIG. 5 is a diagram illustrating an example of an image IM which is displayed on a displayer 34.

Here, when the exchangeable mode is set in Step S108, the mode setter 124 displays the first predetermined time on the displayer 34. FIG. 5 is a diagram illustrating an example of an image IM which is displayed on the displayer 34. The mode setter 124 displays an image IM including information (information on the first predetermined time) indicating a remaining time of the first predetermined time on the displayer 34. The remaining time changes with the elapse of time after the exchangeable mode has been set.

Figure 6:
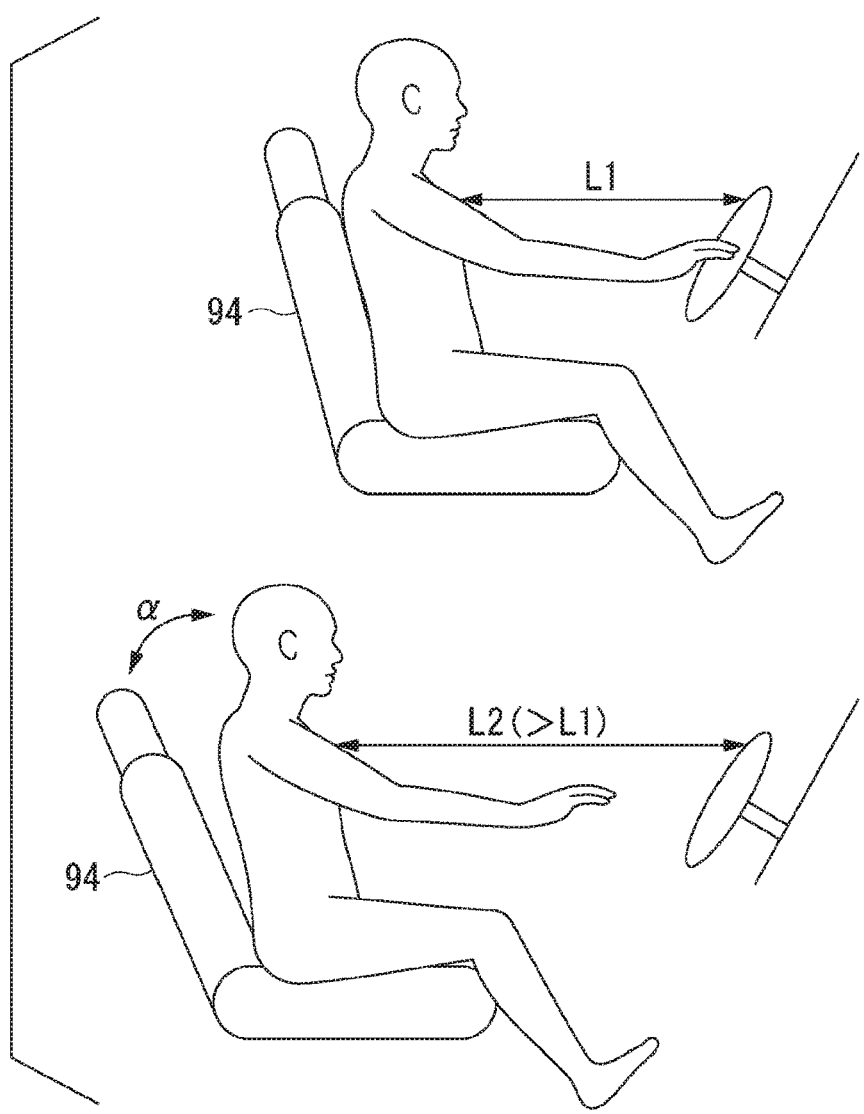
FIG. 6 is a diagram illustrating an example of a state in which a driver seat 94 changes.

When the exchangeable mode is set in Step S108, the mode setter 124 controls the driver seat driver 92 such that the form of the driver seat 94 changes. For example, the driver seat driver 92 changes the driver seat 94 such that an occupant can easily sit in the driver seat 94 or leave the driver seat 94. FIG. 6 is a diagram illustrating an example of a state in which the driver seat 94 changes. The upper part of FIG. 6 illustrates the driver seat 94 before change and the lower part of FIG. 6 illustrates the driver seat 94 after change. For example, when the exchangeable mode is set, the mode setter 124 moves the driver seat 94 to the rear side of the host vehicle M in the horizontal direction. Accordingly, a distance between the occupant and the steering wheel changes from a distance L1 to a distance L2 which is longer than the distance L1. For example, when the exchangeable mode is set, the mode setter 124 inclines the backrest of the driver seat 94 rearward by about an angle α. When an occupant sits in the driver seat 94, the driver seat driver 92 returns the driver seat 94 to the state before change. In this way, the mode setter 124 can improve convenience for an occupant and an occupant to be exchanged by changing the driver seat 94.

When the steering wheel is provided such that a position or an angle thereof can change and the exchangeable mode is set, the position or the angle of the steering wheel may change such that the occupant in the driver seat 94 can easily leave the seat. In this case, for example, the angle of the steering wheel changes or the position thereof moves toward the front windshield.

The embodiment will be continued with reference back to the flowchart illustrated in FIG. 4. When an occupant does not sit in the driver seat 94 in Step S102, the mode setter 124 outputs a warning (Step S116). Then, the mode setter 124 determines whether a second predetermined time has elapsed (Step S118). The second predetermined time is a time from when automated driving is determined not to be maintainable to when control for stopping the host vehicle M is started. The state in which an occupant does not sit in the driver seat 94 is a state in which automated driving cannot be maintained. When an abnormality in the automated driving controller 100, the camera 10, the radar device 12, the finder 14, or the like is detected (for example, when an abnormal measured value or an abnormal control value is detected), it is determined that automated driving cannot be maintained.

When the second predetermined time has not elapsed, the process flow returns to the process of Step S102. When the second predetermined time has elapsed, the first controller 120 starts control for stopping execution of automated driving (Step S120). In this case, the automated driving controller 100 may immediately stop the host vehicle M or may cause the HMI 30 to output information for prompting handover. As a result, the process flow of the flowchart ends.

[Details of Predetermined Conditions]

The predetermined conditions which are conditions for setting the exchangeable mode will be described below. The predetermined conditions are satisfied, for example, when the running state of the host vehicle M is a predetermined running state. The predetermined running state is, for example, a running state in which the running state of the host vehicle M is relatively stable.

FIG. 7 is a diagram illustrating an example of a running state in which the predetermined conditions are satisfied and a running state in which the predetermined conditions are not satisfied. For example, lane keeping in which the host vehicle M is caused to run without departing from the running lane is a running state in which the predetermined conditions are satisfied. On the other hand, when the running state is one running state of lane change (running associated with a lane change event) in which the running lane changes, running in a branching zone (running associated with a branching event) in which the host vehicle M is caused to move to a desired lane in the branching zone or to run without departing from the current running lane, running in a merging zone (running associated with a merging event) in which the host vehicle M is caused to accelerate or decelerate in a merging lane for merging with a main lane in the merging zone and the running lane changes, overtaking running (running associated with an overtaking event) in which the host vehicle M is caused to overtake a preceding vehicle, running with acceleration (running associated with an acceleration running event) in which the host vehicle M is caused to accelerate with predetermined acceleration or higher, and running with deceleration (running associated with a deceleration running event) in which the host vehicle M is caused to decelerate with predetermined deceleration or higher, the predetermined conditions are not satisfied.

When an event associated with the above-mentioned running states is created by the behavior plan creator 123 and is scheduled to be performed within a predetermined time, it is also determined that the predetermined conditions are not satisfied. A handover event in which an automated driving mode transitions to a manual driving mode is scheduled to be executed within a predetermined time, it is also determined that the predetermined conditions are not satisfied. When an event in which an automated driving mode in which an occupant does not have to grip the steering wheel transitions to an automated driving mode in which an occupant has to grip the steering wheel is scheduled to be executed with a predetermined time, it is also determined that the predetermined conditions are not satisfied. The correlation between a running state and information indicating whether the running state satisfies the predetermined conditions is stored in the storage device included in the automated driving controller 100.

The predetermined running state is a state in which the host vehicle is running in a predetermined link. FIG. 8 is a diagram illustrating an example of a link ID in which the predetermined conditions are satisfied and a link ID in which the predetermined conditions are not satisfied. For example, information indicating that the predetermined conditions are satisfied may be correlated with each link ID. For example, a link ID associated with a road in which running of a vehicle is considered to be relatively stable is correlated with information indicating that the predetermined conditions are satisfied, and a link ID associated with a road in which running of a vehicle is considered to be relatively unstable is correlated with information indicating that the predetermined conditions are not satisfied.

The road in which running of a vehicle is considered to be stable is, for example, a motorway or a major road not including a curve or a gradient. Examples thereof also include a motorway or a major road not including a section in a tunnel. Accordingly, a link ID associated with such a motorway is a link in which the predetermined conditions are satisfied. The road in which running of a vehicle is considered to be unstable is, for example, a road having a curve or a gradient or a road including a section in a tunnel. Accordingly, a link ID associated with such a road is a link in which the predetermined conditions are not satisfied. The link IDs and information indicating whether the predetermined conditions are satisfied are stored, for example, in the second map information 62.

The predetermined conditions may be satisfied when one of an event associated with a running state and a link ID satisfies the predetermined conditions or may be satisfied when both thereof satisfy the predetermined conditions.

As described above, when the exchangeable mode is set, automated driving is executed such that the running state becomes more stable because the exchangeable mode has been set. As a result, it is possible to enable smoother exchange of an occupant.

According to the first embodiment described above, when automated driving is being executed in a mode in which an occupant of the vehicle has to sit in the driver seat 94 and the predetermined conditions are satisfied, the mode setter 124 can set the mode of automated driving to the exchangeable mode in which exchange of an occupant who sits in the driver seat 94 is enabled, whereby it is possible to enable smooth exchange of an occupant who sits in the driver seat 94 during automated driving.

Second Embodiment

A second embodiment will be described below. In the first embodiment, it is assumed that the first automated driving mode in which an occupant of a vehicle does not have to sit in the driver seat 94 is provided. In the second embodiment, when an automated driving mode in which an occupant of a vehicle does not have to sit in the driver seat 94 is not provided and automated driving is being executed, it is assumed that an occupant sits in the driver seat 94 in principle. Accordingly, the mode setter 124 in the second embodiment does not determine whether the automated driving mode which is being executed is an automated driving mode in which an occupant has to sit in the driver seat.

Figure 9:
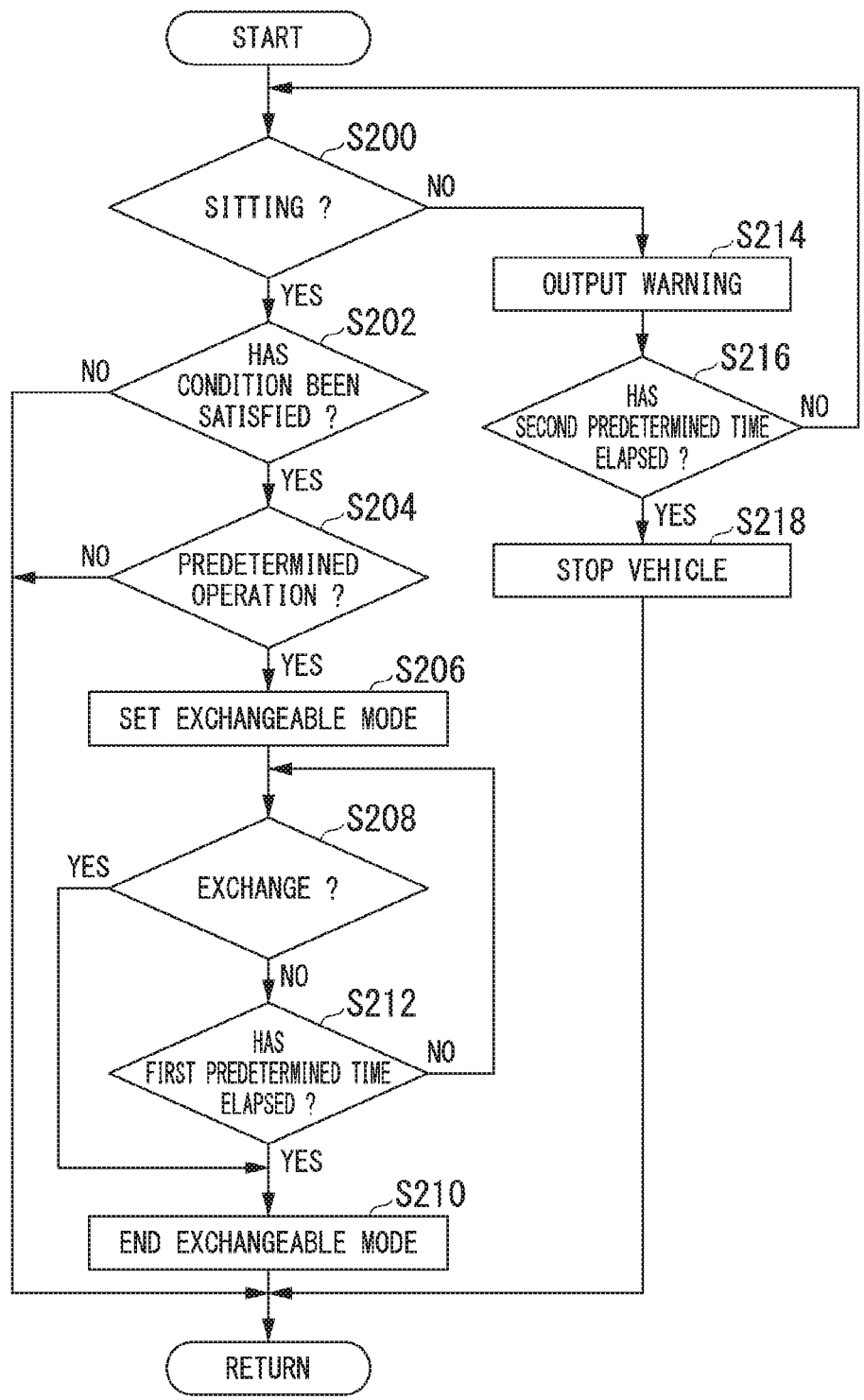
FIG. 9 is a flowchart illustrating a process flow which is mainly performed by a mode setter 124 according to a second embodiment.

FIG. 9 is a flowchart illustrating a process flow which is performed by the mode setter 124 according to the second embodiment. In the second embodiment, the process of determining whether the automated driving mode which is being executed is an automated driving mode in which an occupant has to sit in the driver seat 94 is omitted. Accordingly, first, the sitting determiner 130 performs an image recognizing process on an image captured by the vehicle interior camera 90 and determines whether an occupant sits in the driver seat 94 (Step S200). The subsequent processes are the same as the processes in the flowchart illustrated in FIG. 4 in the first embodiment and thus description thereof will not be repeated. Steps S102 to S120 in the flowchart of FIG. 4 correspond to Steps S200 to S218 in the flowchart of FIG. 9.

A first predetermined time in Step S212 in the second embodiment may change depending on the automated driving mode which has been set before the exchangeable mode is set. For example, when automated driving is being executed in a first automated driving mode having a high degree of automated driving, the first predetermined time is set to be longer than that when automated driving is being executed in a second automated driving mode having a low degree of automated driving. This is because the first automated driving mode requires a lower degree of surrounding observation duty than the second automated driving mode.

According to the second embodiment described above, the same advantageous effects as in the first embodiment can be achieved.

Third Embodiment

A third embodiment will be described below. In the third embodiment, some events (functions) which are instructed by an occupant of a vehicle are limited when the exchangeable mode is set.

In the exchangeable mode, one or more events of a lane change event, a branching event, a merging event, an overtaking event, an acceleration running event with predetermined acceleration or higher, and a deceleration running event with predetermined deceleration or higher are limited. In the exchangeable mode, the function of changing a destination which is performed by the behavior plan creator 123 is limited. This is because when this event is performed, there is a likelihood that behavior of the vehicle will change greatly and thus exchange of an occupant may not be smoothly performed.

Figure 10:
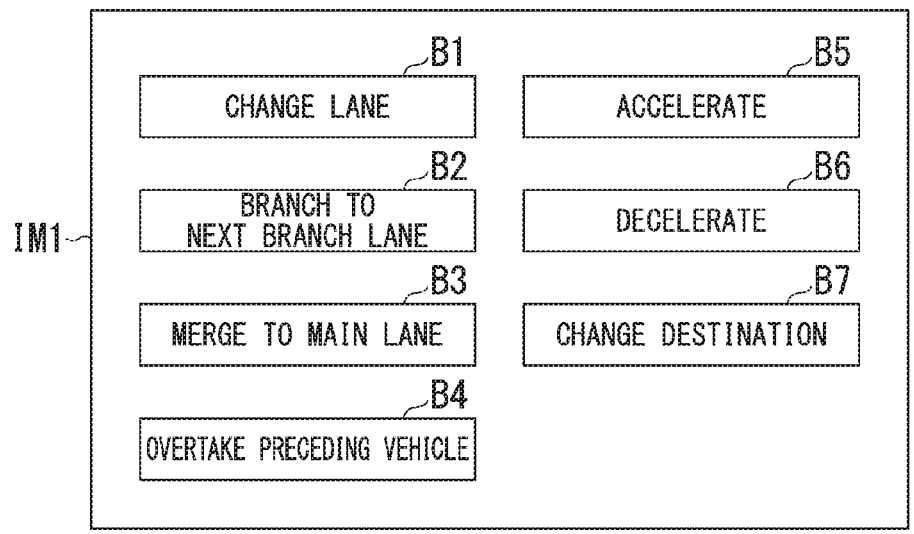
FIG. 10 is a diagram illustrating an example of an image IM1 which is displayed on a displayer 34.

For example, an occupant of a vehicle can cause the host vehicle M to perform a desired event during automated driving by selectively operating one operation button of operation buttons B1 to B7 which are included in an image IM1 displayed on the displayer 34 of the HMI 30. FIG. 10 is a diagram illustrating an example of an image IM1 which is displayed on the displayer 34. The operation buttons B1 to B7 are buttons for performing a lane change event, a branching event in which the vehicle is caused to branch in a branching zone immediate before, a merging event in which the vehicle is caused to merge to a main lane from a merging lane, an overtaking event, a running event with acceleration in which the vehicle is caused to accelerate with predetermined acceleration or higher, a running event with deceleration in which the vehicle is caused to decelerate with predetermined deceleration or higher, and an event in which a destination is changed and the vehicle is caused to run to the changed destination, respectively. The above-mentioned events may be instructed and performed by operating mechanical switches instead of the operation buttons. For example, an operation of a direction indicator (a blinker) may be an instruction to generate a lane change event.

In the third embodiment, when the exchangeable mode is set and an occupant of the vehicle instructs to perform the above-mentioned events, execution of the events is limited.

Figure 11:
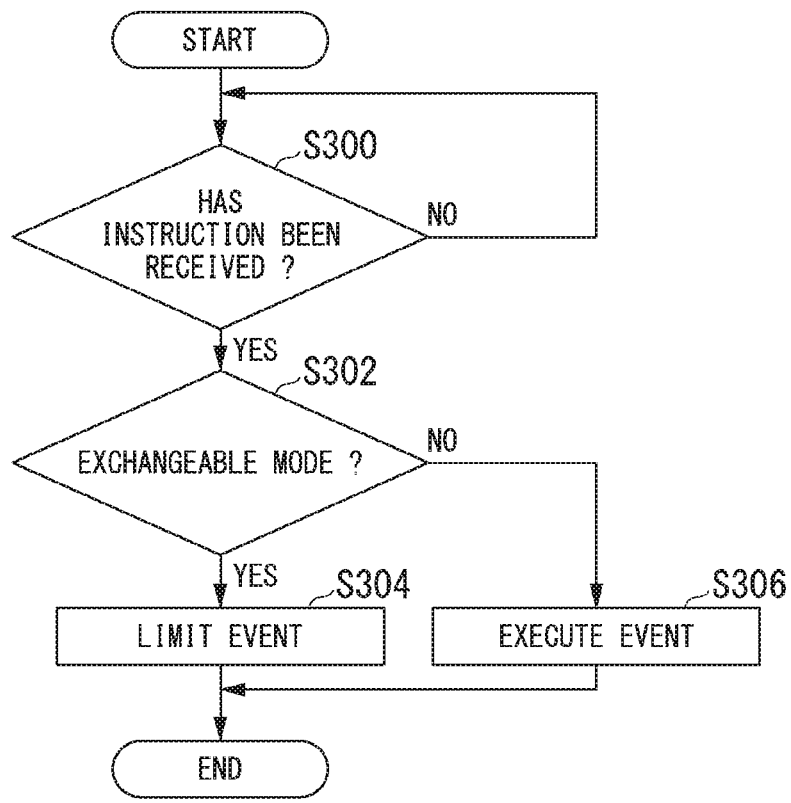
FIG. 11 is a flowchart illustrating a process flow which is performed by a behavior plan creator 123 according to a third embodiment.

FIG. 11 is a flowchart illustrating a process flow which is performed by the behavior plan creator 123 according to the third embodiment. First, the behavior plan creator 123 waits until an instruction to execute to the above-mentioned events is received from an occupant of the vehicle (Step S300). When an instruction to execute an event is received, the behavior plan creator 123 determines whether the exchangeable mode is set by the mode setter 124 (Step S302). When the exchangeable mode is set, the behavior plan creator 123 limits execution of the received event (Step S304). In this case, the behavior plan creator 123 may cause the HMI 30 to output information indicating that execution of the received event is limited.

When the exchangeable mode is not set, the behavior plan creator 123 executes the received event (Step S306). As a result, the process flow of the flowchart ends.

According to the third embodiment described above, since some functions associated with automated driving are limited when the exchangeable mode is being executed, it is possible to prevent behavior of the vehicle from changing greatly at the time of exchange of an occupant who sits in the driver seat 94.

While the mode for carrying out the invention has been described above in conjunction with the embodiments, the invention is not limited to the embodiments and can be subjected to various modifications and substitutions without departing from the gist of the invention.

REFERENCE SIGNS LIST

1 Vehicle system
90 Vehicle interior camera
100 Automated driving controller
120 First controller
121 Outside recognizer
122 Vehicle position recognizer
123 Behavior plan creator
124 Mode setter
130 Sitting determiner
140 Second controller
141 Running controller

What is claim is:

1. A vehicle control system comprising:
an automated driving controller configured to:
execute automated driving in which at least one of acceleration/deceleration and steering of a vehicle is automatically controlled,
set a mode of the automated driving, which is executed by the automated driving controller, and
based on the automated driving being executed in a mode in which an occupant is required to occupy the driver seat and based on predetermined conditions being satisfied, temporarily set the mode of automated driving to an exchangeable mode in which an occupant who sits in a driver seat of the vehicle is able to be exchanged, wherein a predetermined condition of the predetermined conditions is activation of a defined operation associated with performing the exchange during the exchangeable mode, the defined operation is performed by an occupant of the vehicle.

2. The vehicle control system according to claim 1, wherein the automated driving controller is configured to determine whether an occupant of the vehicle is sitting in the driver seat, and
is configured to cause an information outputter to output a warning when the exchangeable mode is not set and it is determined that an occupant of the vehicle is not sitting in the driver seat.

3. The vehicle control system according to claim 1, wherein the automated driving controller is configured to determine whether an occupant of the vehicle is sitting in the driver seat, and
is configured to stop execution of the automated driving when the exchangeable mode is not set and it is determined that an occupant of the vehicle is not sitting in the driver seat.

4. The vehicle control system according to claim 1, wherein the automated driving controller is configured to invalidate the exchangeable mode after a first predetermined time has elapsed after the exchangeable mode has been set.

5. The vehicle control system according to claim 4, wherein the automated driving controller is configured to execute an automated driving mode which is selected from a plurality of automated driving modes having different degrees of automated driving, and
wherein the first predetermined time is set depending on the automated driving mode which is being executed by the automated driving controller.

6. The vehicle control system according to claim 4, wherein the automated driving controller is configured to cause an information outputter to output information on the first predetermined time.

7. The vehicle control system according to claim 1, wherein the predetermined conditions are satisfied when a running state of the vehicle is a predetermined running state.

8. The vehicle control system according to claim 7, wherein the predetermined running state is a state in which the vehicle is running in a motorway.

9. The vehicle control system according to claim 7, wherein the predetermined running state is a state in which the vehicle is running while a lane on which the vehicle runs is kept the same.

10. The vehicle control system according to claim 7, wherein the predetermined running state is a state in which the vehicle is not performing any one of lane change, overtaking running, running in a merging zone, and running in a branching zone.

11. The vehicle control system according to claim 7, wherein the predetermined running state is a state in which the vehicle is not scheduled to perform any one of lane change, overtaking running, running in a merging zone, running in a branching zone, and ending of the automated driving within a predetermined time.

12. The vehicle control system according to claim 1, wherein the automated driving controller is configured to limit certain functions associated with automated driving when the exchangeable mode is being executed.

13. The vehicle control system according to claim 12, wherein the certain functions include at least one function of: a function from performing lane change, a function of performing overtaking, a function of performing running for merging with a main lane from a merging lane, a function of performing running to a branch lane from a main lane in a branching zone, and a function of changing a destination.

14. The vehicle control system according to claim 1, wherein the automated driving controller is configured to set a distance to another vehicle which is automatically controlled when the exchangeable mode is set, the distance being longer than a distance to another vehicle when the exchangeable mode is not set.

15. The vehicle control system according to claim 1, further comprising a driver seat controller configured to change a form of the driver seat in which the occupant sits when the exchangeable mode is set.

16. The vehicle control system according to claim 1, wherein the automated driving controller is configured to determine whether an occupant of the vehicle is sitting in the driver seat,
wherein the automated driving controller is configured to end the exchangeable mode when it is detected that exchange of an occupant after the exchangeable mode has been set.

17. A vehicle control method using a vehicle control device, the vehicle control method comprising:
setting a mode of automated driving which is executed by an automated driving controller configured to execute automated driving in which at least one of acceleration/deceleration and steering of a vehicle is automatically controlled; and
based on the automated driving being executed in a mode in which an occupant must be present in the driver seat and predetermined conditions being satisfied, setting the mode of the automated driving to an exchangeable mode in which an occupant who sits in a driver seat of the vehicle is able to be exchanged, wherein a predetermined condition is receipt of a request for activation of performance of the exchange during the exchangeable mode, the request is output in response to operation by an occupant of the vehicle.

18. A non-transitory computer-readable storage medium that stores a computer program to be executed by a computer to perform at least:
set a mode of automated driving which is executed by an automated driving controller configured to execute automated driving in which at least one of acceleration/deceleration and steering of a vehicle is automatically controlled; and
based on the automated driving being executed in a mode in which an occupant is required to be present in the driver seat and predetermined conditions being satisfied, set the mode of the automated driving to an exchangeable mode in which an occupant who sits in a driver seat of the vehicle is able to be exchanged, wherein a predetermined condition is activation of an exchangeable mode setting switch associated with performing the exchange during the exchangeable mode, the exchangeable mode setting switch is activated in response to operation by an occupant of the vehicle.

* * * * *